United States Patent [19]

Adelmann, Jr.

[11] 4,408,765
[45] Oct. 11, 1983

[54] DIFFERENTIAL PRESSURE CONTROL FOR GAS SEAL IN TURBO MACHINERY

[75] Inventor: William J. Adelmann, Jr., Westchester, Ohio

[73] Assignee: Dresser Industries, Inc., Dallas, Tex.

[21] Appl. No.: 194,110

[22] Filed: Oct. 6, 1980

[51] Int. Cl.³ .............................................. F16J 15/34
[52] U.S. Cl. .......................................... 277/3; 277/29; 277/85; 277/177
[58] Field of Search ............................ 277/3, 29, 81 R

[56] References Cited

U.S. PATENT DOCUMENTS

| 2,509,912 | 5/1950 | Eliasson | 286/9 |
| 2,971,783 | 2/1961 | Laser | 277/29 |
| 2,979,350 | 4/1961 | Lansky | 277/29 |
| 3,026,112 | 3/1962 | Mayer | 277/3 |
| 3,460,844 | 8/1969 | Whittle | 277/85 |
| 3,905,450 | 9/1975 | Persson | 277/177 |
| 4,099,728 | 7/1978 | Wiese | 277/3 |
| 4,114,900 | 9/1978 | Wiese | 277/29 |

FOREIGN PATENT DOCUMENTS 1254180 1/1961 France .................................. 277/74

Primary Examiner—Robert I. Smith
Attorney, Agent, or Firm—Daniel Rubin

[57] ABSTRACT

For limiting leakage of a high pressure buffer gas supply about the gas seal in a turbo compressor, the sliding face on the inward diameter of the seal includes a plurality of axially spaced annular O-ring seals positioned in tandem staged sealing relation thereat. Communicating from between each juxtaposed pair of O-ring seals is a bleed port enabling inter-O-ring pressure to be controlled for any overall pressure differential that is encountered.

5 Claims, 4 Drawing Figures

DIFFERENTIAL PRESSURE CONTROL FOR GAS SEAL IN TURBO MACHINERY

TECHNICAL FIELD

The field of art to which the invention pertains comprises the art of turbo machinery.

BACKGROUND OF THE INVENTION

Turbo-compressors are widely used for imparting high pressures to gases for a variety of process applications typical of which is for booster transmission of natural gas. Characteristic of such compressors is the need of seals for effective control of gas leakage. In recent years the use of the gas seal has been proposed as a substitute for an oil seal and is generally comprised of a stationary carbon ring axially contiguous to the end face of a high velocity rotor. Formations on the rotor end face in opposition to a balance spring bias, aerodynamically force a laterally controlled separation therebetween through which limited high pressure gas leakage can occur. Gas seals are commercially available from companies such as Crane Packing Company or the Koppers Company.

Required to permit lateral movement of the gas seal is a secondary seal along its inward sliding surface to contain flow against the pressure differential to which the gas seal is exposed. Most often the secondary seal is of the resilient O-ring variety which unavoidably in response to the imposed pressure differential tends to incur a drag force opposing sliding movement contemplated for the gas seal. Since the value of the drag force increases in correlation with an increase in differential pressure across the O-ring, it has been necessary to limit applications of the gas seal to encountered pressure differentials within tolerable levels below which significant binding of the sliding action does not occur. This constraint therefore has resulted in limiting the high side pressure of the apparatus which per se has restricted the applications for which the gas seal can be utilized. While recognizing the handicap imposed by the limits of differential pressure, a ready solution for enabling the use of higher pressure differentials has not heretofore been known.

SUMMARY OF THE INVENTION

The invention relates to pressure seals for turbo machinery and more specifically to a secondary seal construction for a gas seal therein able to reduce the drag effect imposed against the sliding member by high pressure differentials. This is achieved in accordance herewith by including a plurality of axially spaced annular O-rings tandemly positioned in series staged sealing relation between the sliding face of the gas seal and the adjacent stationary surface with which it cooperates. Communicating from between each juxtaposed pair of O-rings is a bleed port at which pressures of the incoming flow are substantially averaged in the course of being transmitted. By this arrangement any encountered pressure differential can be readily accommodated by employing a quantity of O-rings selected to control the inter-seal differential between adjacent O-rings to a predetermined maximum so as to limit the pressure drop across each individual O-ring. By restricting the pressure drop in this manner, inter-seal pressure regulation can be effected to in turn limit the drag force on the interacting faces of the seal and permit greater differential pressures to be utilized.

It is therefore an object of the invention to provide a novel gas seal construction for turbo machinery more readily able to accommodate higher differential pressures than similar purpose constructions of the prior art.

It is a further object of the invention to provide a novel secondary seal construction for the gas seal of the previous object that can be readily varied to accommodate greater pressure differentials across the gas seal without slide drag being increased in the manner of the prior art.

It is a further object of the invention to effect the foregoing objects in a highly economical manner.

Figure 1:
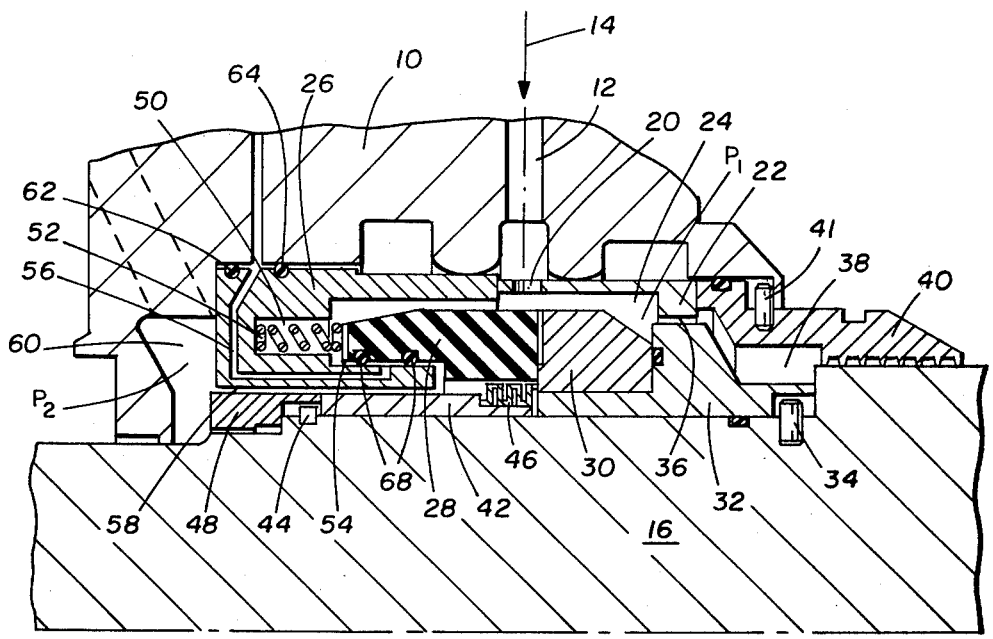
FIG. 1 is a fragmentary sectional view through the gas seal of a multi-stage pipeline compressor utilizing the invention hereof.

Referring now to the drawings, there is illustrated a pipeline booster compressor for natural gas. Such compressors typically have capacity in excess of 30,000 horsepower and operate at 900 psi. As shown, the compressor includes a housing 10 defining a passage 12 for delivering a buffered gas supply represented by arrow 14. Typically, gas supply 14 is in excess of 500 psi, having been bled off from clean discharge of the compressor, and is utilized to eliminate dirt entry in and about rotating compressor shaft 16.

By means of an aperture 20 in spacer 22, gas flow 14 at a designated pressure $P_1$ enters an annular cavity 24 generally defined by annular housing 26, gas seal 28 and running ring 30. Driving running ring 30 is a shouldered rotor 32 secured to shaft 16 via key pin 34. A clearance 36 between rotor 32 and spacer 22 thereat communicates with annular cavity 38 contained by labyrinth seal 40 secured to housing 10 via pin 41. More immediately contiguous to shaft 16 is a sleeve 42 axially positioned between retaining nut 48 and rotor 32 and serving to compress an axial spring 46. Formed within housing 26 is an annular pocket 50 containing a compressed spring 52 urging gas seal 28 toward the radial face of running ring 30 in opposition to the aerodynamic separating forces as will be explained.

Gas seal 28, as noted supra, is of a type commercially available and comprises a carbon seal plate mated with a tungsten carbide running ring 30 turning with compressor shaft 16. Since contact between the high velocity ring and stationary carbon plate would destroy the latter, lift pockets 29 on the seal face adjacent feed slot 31 serve to generate an aerodynamic force urging seal 28 leftward in opposition to a predetermined bias load imposed by spring 52. This results in lateral displacement of the gas seal effecting a minute clearance (not shown) between the opposing faces of the ring and gas seal on the order of approximately 0.0002 inches. Such clearance enables rubbing contact to be avoided while limiting leakage to a controlled amount on the order of about ten C.F.M.

Critical to operation of the gas seal in this relation is the delicate dynamic balance achieved by the controlled lateral displacement of the carbon ring. Tending to interfere with that balance in the past has been a degree of frictional drag imposed by any secondary seal acting to contain the pressure differential across the gas seal. The greater the encountered differential pressure, the greater the drag which in turn has restricted the differential pressures with which such gas seals could be utilized.

Figure 2:
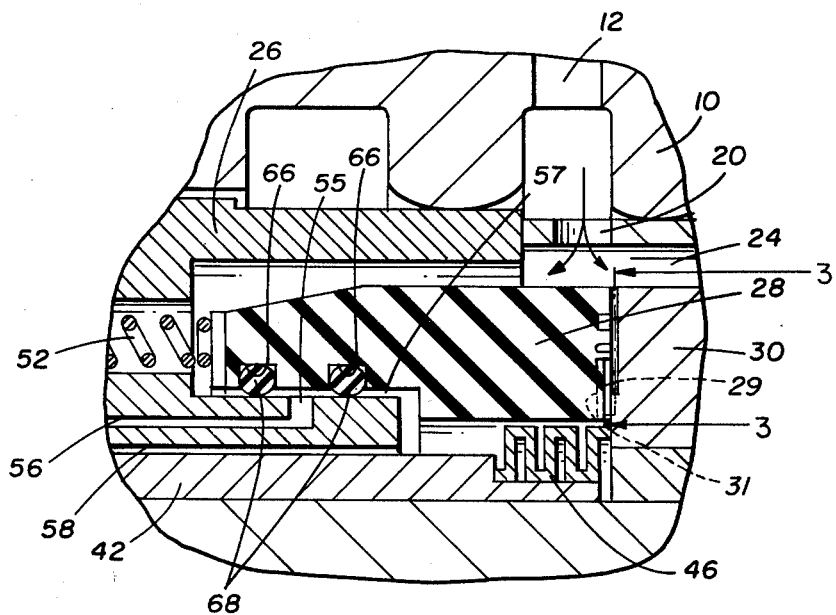
FIG. 2 is an enlarged fragmentary section of the relevant portion of the compressor of FIG. 1.
Figure 3:
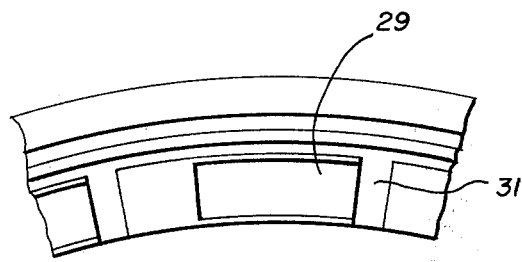
FIG. 3 is a side view as seen substantially along the line 3—3 of FIG. 2.
Figure 4:
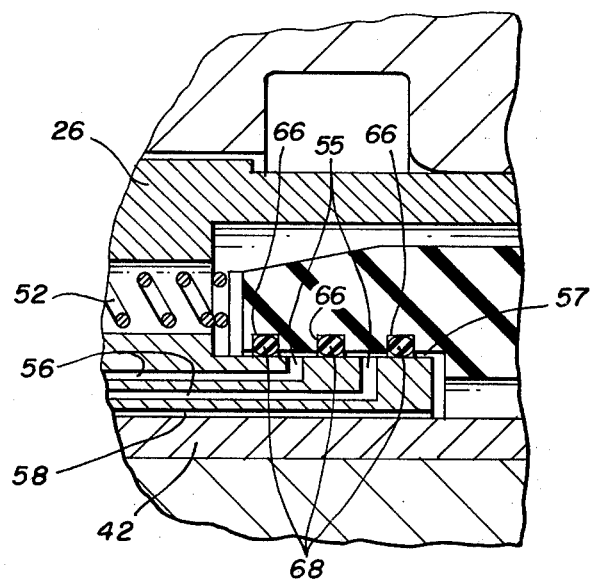
FIG. 4 is a fragmentary section representing a modification of FIG. 2.

For providing controlled secondary sealing in accordance with the invention hereof, the underside of carbon seal 28 includes a plurality of slotted recesses 66 arranged in tandem, each of which contain an O-ring gasket 68. Each O-ring is in compressed sealing relation against the sliding surface of housing 26 thereat for sealing clearance 57. Communicating from an inlet 55 extending from between each juxtaposed pair of O-ring gaskets is a bleed port 56 achieving an average pressure of $(P_1-P_2/2)$. The effect thereof is to reduce the pressure drop across each individual O-ring and consequently reduce the frictional drag from what would otherwise be imposed thereby to within tolerable limits. Consistent with the foregoing, the precise number of recesses 66 and corresponding number of O-ring gaskets 68 are selected so as to minimize drag imposed by excessive pressure differential to any predetermined value dependent to some degree on the O-ring characteristics, surface properties, etc. Whatever number or quantity is determined as necessary, whether two as illustrated in FIG. 2 or more than two as illustrated in FIG. 4, there is provided in communication between each tandem pair a bleed port 56 effecting a controlled inter-seal pressure thereat.

By the above description there is disclosed novel construction for enabling use of gas seals in a turbo compressor at significantly greater pressure differentials than previously possible. Through the use of inter-seal pressure control of the secondary seal, the drag imposed on any of the O-rings 68 is minimized so as not to interfere with the aerodynamic balance relation of carbon seal 28 and biasing spring 52. Consequently, by a simple construction for the secondary seal the previous limitation of pressure differential across the secondary seal is readily overcome.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In turbo machinery for gas compression including a rotating shaft, a non-rotatable gas seal of carbon composition generally surrounding a portion of said shaft and adapted for slideable displacement thereover, a rotatable running ring having a radial face situated contiguously opposed to a radial face on said gas seal, force generating means on the opposing face of said gas seal or said ring effective during the course of rotation to create aerodynamic forces urging lateral separation between the contiguous opposed faces of said gas seal and said running ring by slideably displacing said gas seal away from said running ring, and spring means axially urging said gas seal toward said running ring in balanced opposition to the aerodynamic forces created by said force generating means to effect a controlled leakage clearance between the opposed faces of said gas seal and said running ring, the improvement comprising secondary seal means contained in a clearance defined in a flow path of the gas between the relatively sliding surface of said gas seal and its supporting surface thereat for effecting a controlled pressure seal in said seal clearance while concomitantly effecting a predetermined limit of frictional drag force imposed against slideable displacement of said gas seal and correlated to the operational displacement required of said gas seal, said secondary seal means comprising at least two tandemly arranged resilient O-ring gaskets in said seal clearance and a bleed port communicating from inward of said seal clearance and between said O-rings to an outlet at a gas pressure of lower value than the gas pressure exposed to the inlet surface of said gas seal.

2. The improvement according to claim 1 in which said at least two tandemly arranged O-ring gaskets comprise a plurality of O-rings of quantity greater than two and there is defined a said bleed port communicating to between each adjacent pair of said O-ring gaskets.

3. The improvement according to claim 2 in which the quantity of said O-ring gaskets is correlated to maintain a controlled inter-seal pressure of predetermined value for a given pressure differential to be encountered across said gas seal.

4. The improvement according to claim 3 in which the value of said controlled inter-seal pressure is correlated to the frictional drag properties between said O-ring gaskets and the supporting surface of said gas seal when said gas seal is being slideably displaced aerodynamically by said force generating means.

5. The improvement according to claims 1, 2, 3 or 4 in which said turbo machinery comprises a pipeline booster compressor.

* * * * *